United States Patent

Zetterström et al.

[11] Patent Number: 5,833,026
[45] Date of Patent: Nov. 10, 1998

[54] WHEEL SUSPENSION FOR A PAIR OF DRIVEN VEHICLE WHEELS

[75] Inventors: Sigvard Zetterström, Hakenäset; Kjell Sjösten, Västra Frölunda, both of Sweden

[73] Assignee: AB Volvo, Gothenburg, Sweden

[21] Appl. No.: 765,312

[22] PCT Filed: Jun. 27, 1995

[86] PCT No.: PCT/SE95/00789

§ 371 Date: Jan. 22, 1997

§ 102(e) Date: Jan. 22, 1997

[87] PCT Pub. No.: WO96/00661

PCT Pub. Date: Jan. 11, 1996

[30] Foreign Application Priority Data

Jun. 28, 1994 [SE] Sweden ................................. 9402275

[51] Int. Cl.⁶ .............................. B60K 17/16; B60G 3/18; B60G 11/08; B60G 21/055
[52] U.S. Cl. .................. 180/360; 180/362; 280/124.107; 280/124.109; 280/124.128; 280/124.135; 280/124.153; 280/124.156; 280/124.171
[58] Field of Search ..................................... 280/688, 689, 280/690, 694, 699, 719, 720, 788, 124.1, 124.106, 124.107, 124.109, 124.128, 124.135, 124.136, 124.139, 124.143, 124.151, 124.153, 124.156, 124.171, 124.175; 180/359, 360, 362, 378; 267/188, 189, 229, 230, 246

[56] References Cited

U.S. PATENT DOCUMENTS

| | | | |
|---|---|---|---|
| 1,535,497 | 4/1925 | Roche ...................................... | 280/694 |
| 2,157,773 | 5/1939 | Probst ...................................... | 180/360 |
| 2,496,906 | 2/1950 | Churchill .............................. | 267/230 |
| 2,669,315 | 2/1954 | Butferfield .............................. | 180/345 |
| 2,945,678 | 6/1960 | Uhlenhaut et al. ...................... | 180/360 |
| 3,147,815 | 9/1964 | Arkus-Dontov et al. ............... | 180/360 |
| 3,193,042 | 7/1965 | Brewer .................................... | 180/359 |
| 3,379,269 | 4/1968 | Zetye ....................................... | 180/362 |
| 3,388,762 | 6/1968 | Bausch .................................... | 180/349 |
| 3,451,497 | 6/1969 | Barnes et al. ............................ | 180/360 |
| 3,603,422 | 9/1971 | Cordiano ................................. | 180/359 |
| 4,458,918 | 7/1984 | Rumpel ................................... | 280/718 |
| 4,614,359 | 9/1986 | Lundin et al. ........................... | 280/699 |
| 4,714,132 | 12/1987 | Hattori et al. .......................... | 280/690 |
| 4,722,544 | 2/1988 | Weber ..................................... | 280/688 |
| 4,813,704 | 3/1989 | Smith ...................................... | 280/719 |
| 4,826,203 | 5/1989 | Kijima et al. ........................... | 280/690 |
| 4,998,748 | 3/1991 | Kashiwaga et al. .................... | 280/690 |

FOREIGN PATENT DOCUMENTS

| | | |
|---|---|---|
| 0 287 278 | 10/1988 | European Pat. Off. . |
| 562775 | 10/1932 | Germany . |
| 771745 | 4/1957 | Germany . |
| 1 132 006 | 6/1962 | Germany . |
| 1 555 163 | 11/1970 | Germany . |
| 1 499 696 | 2/1978 | Germany . |
| 57-191111 | 11/1982 | Japan . |
| WO 90/05083 | 5/1990 | WIPO . |

*Primary Examiner*—Peter C. English
*Attorney, Agent, or Firm*—Young & Thompson

[57] ABSTRACT

Wheel suspension for a pair of driven motor vehicle wheels, comprising a member (1), which consists of two cast aluminum member elements (2, 3) which are joined to each other. The member is intended to be fixed to a vehicle undercarriage. A wheel carrier (15) for each wheel is carried by the member via an upper and a lower link arm (12, 13), a slotted rod (14) and a longitudinal bar (18). A final drive unit (4) is fixed to the member together with a transverse leaf spring (30), which forms the wheel spring system, without the use of any special through-fasteners.

14 Claims, 3 Drawing Sheets

WHEEL SUSPENSION FOR A PAIR OF DRIVEN VEHICLE WHEELS

BACKGROUND OF THE INVENTION

The present invention relates to a wheel suspension for a pair of driven motor vehicle wheels, comprising a member intended to be fixed to a vehicle undercarriage, for each wheel an upper and a lower link arm pivotally joined to a wheel carrier, a longitudinal bar pivotally connectable to the vehicle undercarriage and pivotally connected to the wheel carrier, a slotted rod pivotally joined to the member and to the respective wheel carrier, spring means acting between the respective wheel carrier and the member, shock absorbers and an anti-roll bar, a differential carried by the member, and a pair of wheel axles driven by the differential transmission, said axles each being joined to an individual wheel hub mounted in the respective wheel carrier.

DESCRIPTION OF THE RELATED ART

SE-A-458 514, for example, describes a wheel suspension of the type described by way of introduction, which provides high comfort and good road properties in the vehicle by, among other things, achieving stabilization and equalization of forces affecting the rear wheels, in order to avoid undesired steering of the rear wheels. Furthermore, the known wheel suspension provides a relatively large amount of space for various installations in the area around the rear wheels.

The wheel suspension known by SE-A-458 514 has a member system comprised of a plurality of pressed sheet metal parts which are welded together. In order to compensate for unavoidable tolerance deviations, the lower link arm and the slotted rod are fixed to the member by means of bolts with excentric bushings, so that the correct camber angle and toe-in of the wheels can be adjusted after mounting.

The differential is screwed securely to the member. The longitudinal arms act as supporting arms for the wheel spring system and helical springs arranged concentrically therewith, said springs resting against seats on the tops of the supporting arms. An anti-roll bar is joined to the member on the rear side of the member via links with caps screwed securely over the rubber bushings, which grip over the anti-roll bar.

SUMMARY OF THE INVENTION

The purpose of the present invention is to achieve a wheel suspension of the type described by way of introduction, which, while retaining the positive features of the known wheel suspension described above as regards comfort and ride can be manufactured at lower cost and be made lighter.

This is achieved according to the invention by virtue of the fact that the member comprises an upper and a lower member element, said elements being screwed securely to each other and fixing the differential between them via elastic damping elements.

A cast aluminum member system can be manufactured with much closer tolerances than the previously known system consisting of pressed sheet metal components which are welded together. This also means that the link arm and the slotted rod can be joined to the member by means of screw fasteners which are free of play, e.g. serration screws, since after-adjustment will no longer be needed. By clamping the differential between the upper and lower member elements, simple assembly is achieved. No through-fixing elements are required to keep the differential in place, only screw fasteners which hold the member elements together.

In a wheel suspension of the type described by way of introduction, by replacing, in accordance with the invention, the conventional helical springs of the suspension with a transverse leaf spring, which has a central portion securely fixed to the member and end portions acting against a top side of each lower link arm, it is possible to achieve a design which saves weight and space. By virtue of the fact that the longitudinal bars no longer need to serve as supporting arms for the wheel springs but are primarily bars for fixing the wheel carrier in the longitudinal direction of the vehicle, their design can be simplified and their dimensions be reduced.

The free space in front of the member between the longitudinal bars can be used with advantage for a U-shaped curved anti-roll bar, which is joined to each longitudinal bar and to the member, the connection between the longitudinal bars lying approximately midway between the ends of each bar. Such a design provides better efficiency for the anti-roll bar than does the previously known design with the anti-roll bar placed behind the member.

BRIEF DESCRIPTION OF THE DRAWINGS

The invention will be described in more detail with reference to examples shown in the accompanying drawings, where.

DESCRIPTION OF THE PREFERRED EMBODIMENTS

The wheel suspension according to the invention is a direct further development of the wheel suspension shown in SE-A-458 514. The basic geometry, function and properties are the same in the two wheel suspensions and therefore will not be dealt with in more detail here. For a detailed description, reference is made to SE-A-458 514.

Figure 3:
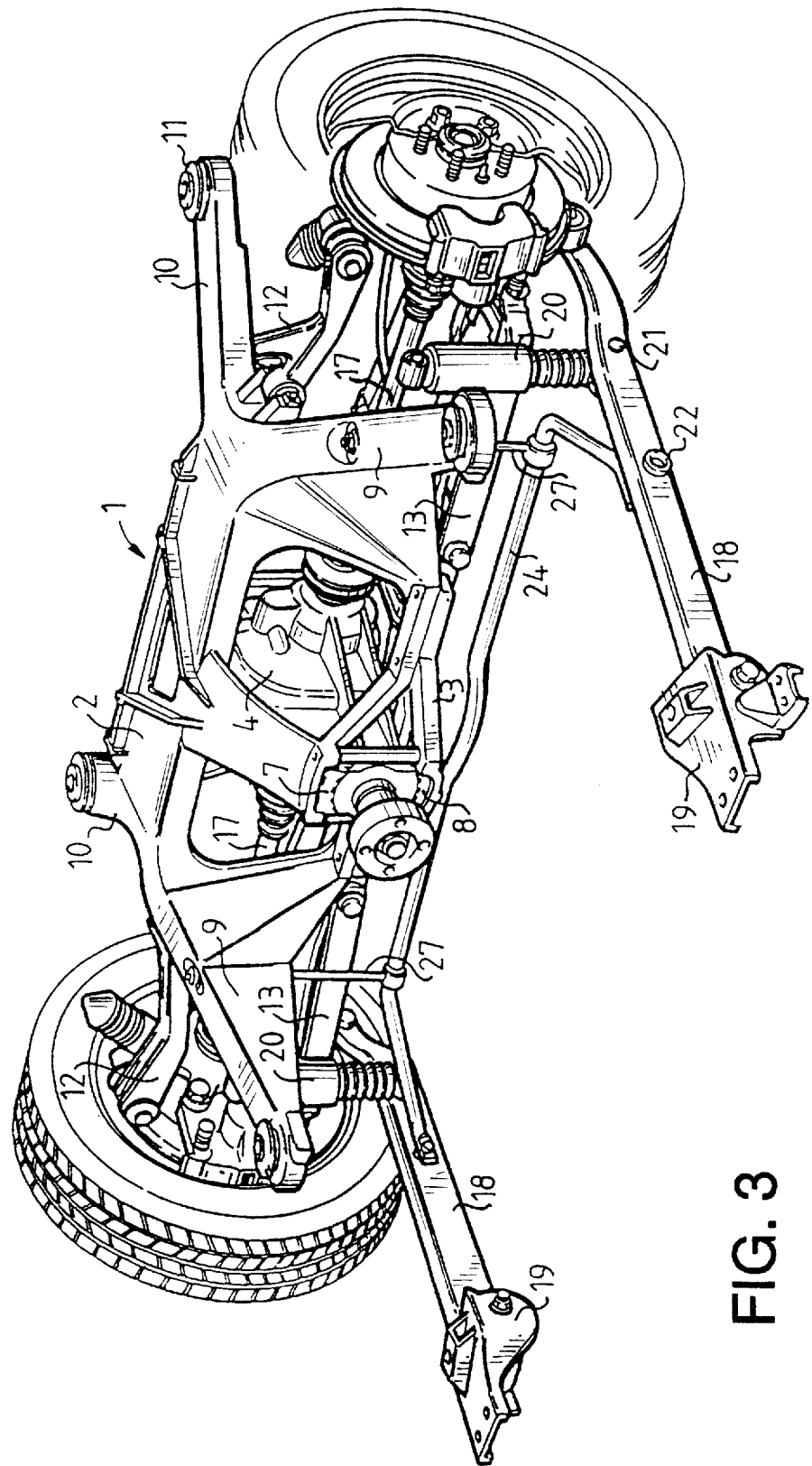
FIG. 3 shows the wheel suspension of FIG. 1 and 2 after final assembly but before being mounted in the vehicle.

According to the invention, a rear axle member (FIG. 3) generally designated 1, comprises an upper member element 2 and a lower member element 3, which are made of chill-cast aluminum and are fixed to each other by means of a screw fastener. Member elements 2,3 are cast with forward and rear seats for a final drive unit 4 (differential), of which only the front seats 5 and 6 are shown in more detail. When the member elements 1 and 2 are screwed together, the final drive unit 4 is clamped between forward and rear blocks of elastic material, e.g. rubber, of which only the forward blocks 7 and 8 are visible in the Figures.

Figure 1:
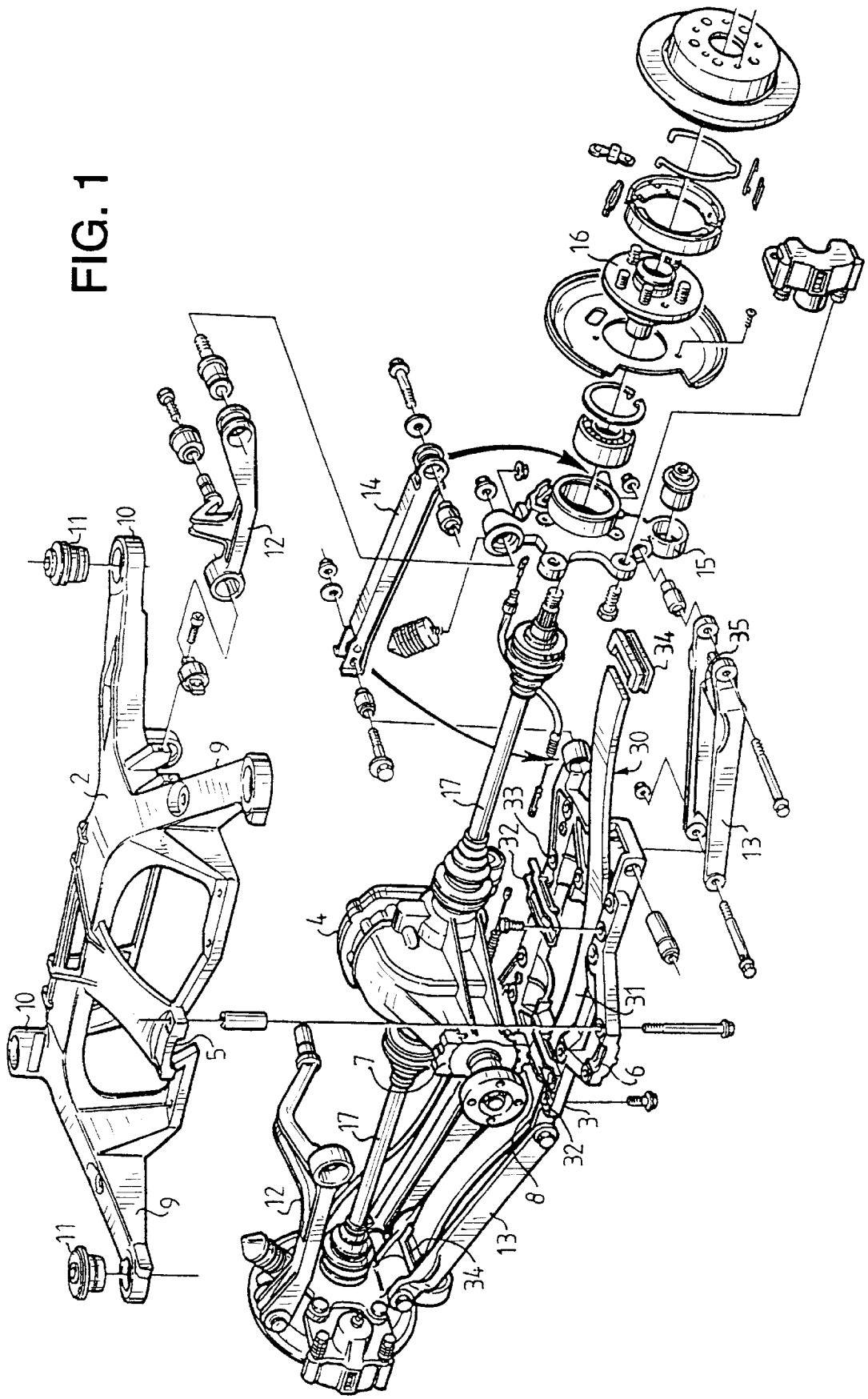
FIG. 1 and 2 show two exploded views of a preferred embodiment of a wheel suspension according to the invention, in two different states of assembly.
Figure 2:
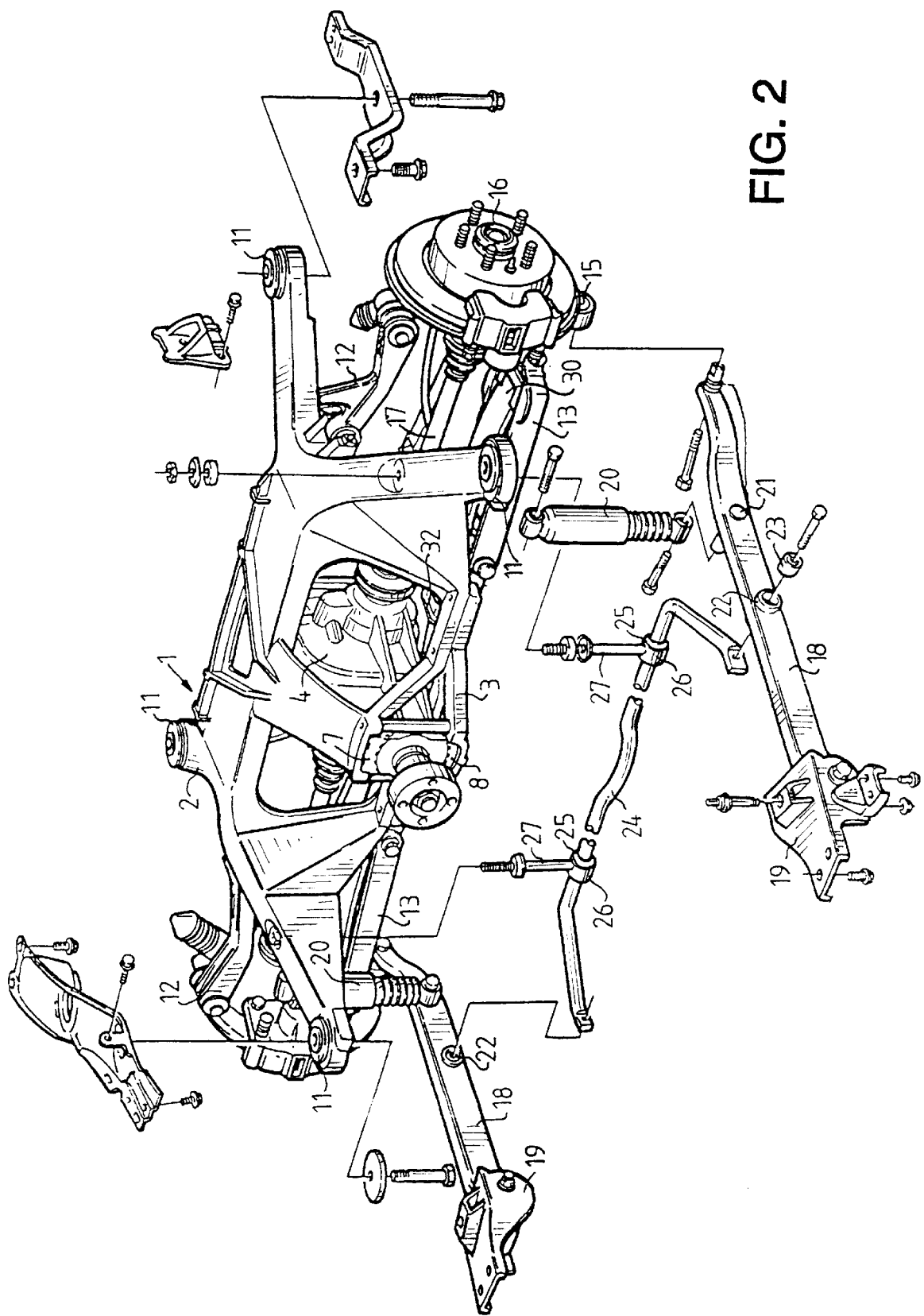

The upper member element 2 is cast with two forward arms 9 and two rear arms 10, in the ends of which there are elastic bushings 11 in bores. Via screws through the bushings 11, the rear axle member 1 is screwed securely to the undercarriage of the vehicle. In the upper member element 2, an upper link arm 12 is pivotally mounted. A lower link arm 13 is pivotally mounted in the lower member element 3 as is a slotted rod 14. The link arms 12,13 and the slotted rod 14 have distal ends, which are pivotally mounted in the wheel carrier 15, in which a wheel hub 16 is rotatably mounted. Said wheel hub 16 is drivingly connected via splines to a drive shaft 17 driven by the final drive unit 4. The wheel carrier 15 is pivotally joined to one end of a longitudinal bar 18 (FIG. 2 and 3), the other end of which is pivotally mounted in a bracket 19 which is intended to be screwed securely to the undercarriage of the vehicle.

Completely cylindrical tubes are used as starting blanks for the longitudinal bars 18, which are mandrelled, flattened and bended in a plurality of planes to the shape shown in the Figures. The lower end of a shock absorber 20 is mounted on a pin 21 fixed to the bar 18. The upper end is intended to be fixed in a conventional manner to the undercarriage of the vehicle. A bushing sleeve 22 is fixed in a through-bore in the bar 18. Said sleeve houses a rubber bushing 23 with an inner bushing sleeve for fixing the ends of a U-shaped anti-roll bar 24 in each longitudinal bar 18. Rubber bushings 25 are vulcanized onto the anti-roll bar 24 and sleeves 26 are forced thereon. Each sleeve 26 is made in one piece with an associated link 27, for example, in a high-strength plastic material, such as nylon. As is particularly evident from FIG. 2, the mounting point of the anti-roll bar 24 in the longitudinal bar 18 is approximately midway between the ends of said bar 18. This makes the anti-roll bar highly efficient. The integrated design of the anti-roll bar 24 and the links 27 together with the bushings 22,23 in through-holes in the longitudinal bars 18 provides a simple, reliable and easily assembled design.

Instead of a conventional wheel suspension system with a pair of helical springs arranged concentrically with the shock absorbers, the wheel suspension according to the invention has a transverse wave-shaped preformed leaf spring 30, which is common to the two wheels. The leaf spring 30 has a central portion or a midportion 31. The leaf spring 30 may consist of fiberglass reinforced epoxy plastic. Caps 32, which are screwed securely to the lower member element 3 and which carry shear-soft rubber blocks 33 vulcanized thereto, fix the midportion 31 to the member element 3. At its ends, the leaf spring 30 is in contact with its underside against rubber blocks 34, which are held in seats 35 at the top of the outer end of each lower link arm 13. The spring 30 thus passes below the final drive unit 4 and is fixed so that the space between the final drive unit 4 and the ground-free-passage line is minimized. The spring 30 lacks, as does the final drive unit 4, fixing elements which pass through them. The rubber blocks 33 of the caps 32 are intended, when the wheels are pushed far up, to be compressed and permit a certain amount of movement of adjacent spring portions upwards, thus contributing to reducing the downward deflection of the center portion 31 of the spring.

All of the mountings and joints described above are elastic and thus lack surfaces which slide against each other. The wheel suspension requires, in principle, no maintenance, and the only components which require replacement during the life of the vehicle are the shock absorbers.

We claim:

1. Wheel suspension for a pair of driven motor vehicle wheels, comprising a member intended to be fixed to a vehicle undercarriage, for each wheel an upper and a lower link arm pivotally joined to a wheel carrier, a longitudinal bar pivotally connectable to the vehicle undercarriage and pivotally connected to the wheel carrier, a slotted rod pivotally joined to the member and to the respective wheel carrier, spring means for providing compression and extension acting between the respective wheel carrier and the member, shock absorbers and an anti-roll bar, a differential carried by the member, and a pair of wheel axles driven by the differential, said axles each being joined to an individual wheel hub mounted in the respective wheel carrier, wherein the member comprises an upper and a lower cast aluminum member element (2,3), said elements being screwed securely to each other and fixing the differential (4) between them via elastic damping elements (7,8).

2. Wheel suspension according to claim 1, wherein the spring means are formed of a transverse leaf spring (30), which has a central portion (31) securely fixed to the member (1), and end portions acting against a top side (35) of each lower link arm (13).

3. Wheel suspension according to claim 2, wherein the leaf spring (30) consists of fiberglass reinforced epoxy plastic.

4. Wheel suspension according to claim 2, wherein the central portion (31) of the leaf spring (30) has an upper surface in contact with at least one pair of spaced elastic damping elements (33), which, when compressed during the upward resilient movement of the wheels, permits a certain displacement upwards of the portions of the spring abutting against the damping elements, to reduce, during the resilient movement, the deflection downwards of the spring portion located between the damping elements.

5. Wheel suspension according to claim 1, wherein said anti-roll bar is U-shaped and curved, and is joined to each longitudinal bar (18) and to the member (1), the connection to each longitudinal bar lying approximately midway between the two ends of said longitudinal bar.

6. Wheel suspension according to claim 5, wherein the anti-roll bar (24) is joined to the upper member element (2) via a pair of vertical links (27), each of said vertical links having at a lower end, an integral sleeve (26), each of said integral sleeves being forced over a bushing (25) of elastic material adhesively fixed to the anti-roll bar.

7. Wheel suspension according to claim 6, wherein the bushings (25) of elastic material are rubber bushings securely vulcanized to the anti-roll bar (24).

8. Wheel suspension according to claim 5, wherein each of the shock absorbers (20) are fixed in one of said longitudinal bars (18) at a point which is located between the point of attachment of the anti-roll bar (24) to the said one longitudinal bar and the wheel carrier (15).

9. Wheel suspension for a pair of driven motor vehicle wheels, comprising a member designed to be fixed to a vehicle undercarriage, for each wheel an upper and a lower link arm pivotally joined to the member and to a wheel carrier, a longitudinal bar pivotally connectable to the vehicle undercarriage and to the respective wheel carrier, a slotted rod pivotally joined to the member and to the respective wheel carrier, spring means for providing compression and extension between the respective wheel carrier and the member, shock absorbers and an anti-roll bar acting between the respective wheel carrier and the member, a differential carried by the member, and a pair of wheel axles driven by the differential and which are joined to individual wheel hubs mounted in respective wheel carriers, wherein the spring means are formed by a transverse leaf spring (30), which has a central portion (31) securely fixed to the member (1), and end portions acting against a top side (35) of each lower link arm (13).

10. Wheel suspension according to claim 9, wherein the leaf spring (30) consists of fiberglass reinforced epoxy plastic.

11. Wheel suspension according to claim 9, wherein the central portion (31) of the leaf spring (30) has a top side in contact with at least a pair of spaced elastic damping elements (33) which, during compression as the wheels move resiliently upwards, permit a certain displacement upwards of the portions of the spring in contact with the damping elements in order to reduce, during the resilient movement, the deflection downwards of the spring portion between the damping elements.

12. Wheel suspension according to claim 11, wherein the end portions of the leaf spring (30) act against the top sides (35) of the lower link arms (13) via elastic damping elements (34).

13. Wheel suspension for a pair of driven motor vehicle wheels, comprising a member intended to be fixed to a vehicle undercarriage, for each wheel upper and lower link arms pivotally joined to a wheel carrier, a longitudinal bar pivotally connected to the vehicle undercarriage and pivotally connected to the respective wheel carrier, a slotted rod pivotally connected to the member and to the respective wheel carrier, spring means for providing compression and extension between the respective wheel carrier and the member, shock absorbers and an anti-roll bar acting between the respective wheel carrier and the member, a differential carried by the member, and a pair of wheel axles driven by the differential, said wheel axles being joined to individual wheel hubs mounted in respective wheel carriers, wherein the anti-roll bar (24) is U-shaped and curved, and is joined to each longitudinal bar (18) and to the member (1), the connection to the respective longitudinal bar being approximately midway between the two ends of the respective longitudinal bar.

14. Wheel suspension according to claim 13, wherein the anti-roll bar (24) is joined to the member via a pair of vertical links (27), each having at a lower end an integral sleeve which is forced over a bushing (25) of elastic material adhesively fixed to the anti-roll bar.

* * * * *